United States Patent
Matsuo

(10) Patent No.: US 9,432,574 B2
(45) Date of Patent: Aug. 30, 2016

(54) METHOD OF DEVELOPING AN IMAGE FROM RAW DATA AND ELECTRONIC APPARATUS

(71) Applicant: SAMSUNG ELECTRONICS CO., LTD., Suwon-si, Gyeonggi-do (KR)

(72) Inventor: Takeshi Matsuo, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 14/324,551

(22) Filed: Jul. 7, 2014

(65) Prior Publication Data

US 2015/0015734 A1    Jan. 15, 2015

(30) Foreign Application Priority Data

Jul. 11, 2013  (JP) ................................ 2013-159293
Feb. 21, 2014  (KR) ........................ 10-2014-0020817

(51) Int. Cl.
*H04N 5/232*  (2006.01)
*H04N 1/21*  (2006.01)
*H04N 5/225*  (2006.01)
*H04N 5/228*  (2006.01)

(52) U.S. Cl.
CPC ............ *H04N 5/23229* (2013.01); *H04N 1/21* (2013.01); *H04N 5/23203* (2013.01); *H04N 5/23216* (2013.01); *H04N 5/23225* (2013.01)

(58) Field of Classification Search
CPC ......... G03B 2206/00; H04N 1/00132; H04N 7/185; H04N 5/23206; H04N 5/23229; H04N 5/23293
USPC ......... 348/207.1, 207.2, 211.1–211.4, 222.1, 348/333.01
See application file for complete search history.

(56) References Cited

U.S. PATENT DOCUMENTS

| | | | |
|---|---|---|---|
| 7,408,571 B2 | 8/2008 | Tanaka et al. | |
| 8,620,112 B2 * | 12/2013 | Mikawa | G06F 17/30265 348/222.1 |
| 2005/0275729 A1 * | 12/2005 | Billerbeck | G06F 3/0481 348/222.1 |
| 2007/0209056 A1 * | 9/2007 | Mayuzumi | H04N 1/00127 725/105 |
| 2009/0290042 A1 * | 11/2009 | Shiohara | H04N 1/00132 348/222.1 |
| 2010/0091114 A1 * | 4/2010 | Ito | H04N 1/00127 348/207.1 |
| 2011/0298933 A1 * | 12/2011 | Yanowitz | H04N 5/367 348/175 |
| 2014/0293069 A1 * | 10/2014 | Lazar | G06F 17/30256 348/207.1 |

FOREIGN PATENT DOCUMENTS

| | | |
|---|---|---|
| JP | 2003-289498 A | 10/2003 |
| JP | 2006-166250 A | 6/2006 |
| JP | 2007-134958 A | 5/2007 |
| JP | 2012-147303 A | 8/2012 |

* cited by examiner

*Primary Examiner* — Kelly L Jerabek
(74) *Attorney, Agent, or Firm* — Drinker Biddle & Reath LLP

(57) ABSTRACT

An electronic apparatus is described. The electronic apparatus includes: a photographing unit which generates raw data by photographing processing; a non-transitory memory which stores interface information for displaying, on a display unit of an external device, a development interface which receives setting operations that set development parameters used in development processing of the raw data; a communication unit which transmits the interface information to the external device and receives from the external device the development parameters set on the external device; and an image processing unit which, based on the development parameters received from the communication unit, performs the development processing of the raw data and generates development data for display.

13 Claims, 5 Drawing Sheets

METHOD OF DEVELOPING AN IMAGE FROM RAW DATA AND ELECTRONIC APPARATUS

CROSS-REFERENCE TO RELATED PATENT APPLICATIONS

This application claims the priority benefit of Korean Patent Application No. 10-2014-0020817, filed on Feb. 21, 2014, in the Korean Intellectual Property Office, the disclosure of which is incorporated by reference herein in its entirety.

This application is also related to Japanese Patent Application No. 2013-159293, filed on Jul. 31, 2013, in the Japanese Patent Office.

BACKGROUND

1. Field

The present disclosure relates to methods for developing images from raw data and related electronic apparatuses.

2. Related Art

Recently, a function which records raw data obtained from an image sensor when a still image is captured, without processing the raw data, has been provided to digital cameras.

However, this raw data cannot be readily displayed for browsing. Image processing, which is called raw image development, is generally required for browsing or viewing an image. Raw image development is a process in which image processing, such as supplementary processing, tone correction, or white balance adjustment, is performed on image data in a raw form (raw data) which is recorded without image processing, and thus a new image in a Joint Photographic Experts Group (JPEG) format is generated and stored.

Thus far, in many cases, raw data is stored in a personal computer (PC) and processing for raw image development is performed in the PC. Recently, a function for processing raw image development in a digital camera main body has been suggested.

However, processing of the raw image development requires a large amount of processing power. When a low-performance PC is used for processing the development, it may take several minutes to process one image. Accordingly, an expensive, high-performance PC should be purchased in order to save time, or an expensive dedicated application for development processing corresponding to the type of the device which photographed the raw data should be purchased.

Meanwhile, the processing of raw images in a digital camera main body is completed in a short time. This is because the digital camera has a dedicated hardware unit for processing the raw image. However, since there are so many parameters or types of parameters for processing raw images, it is very inconvenient to properly set desired parameters when using a digital camera having a small display screen and only a limited number of buttons.

SUMMARY

Various embodiments of the present disclosure include a method of developing an image from raw data and an electronic apparatus.

Additional embodiments will be set forth in part in the description which follows and, in part, will be apparent from the description, or may be learned by practice of the presented embodiments.

According to various embodiments, an electronic apparatus may include: a photographing unit which generates raw data by photographing processing; a non-transitory memory which stores interface information for displaying, on a display unit of an external device, a development interface which receives setting operations that set development parameters used in development processing of the raw data; a communication unit which transmits the interface information to the external device and receives from the external device the development parameters set on the external device; and an image processing unit which, based on the development parameters received from the communication unit, performs the development processing of the raw data and generates development data for display.

The interface information may include information indicating a type of development parameters which are configurable in the development processing performed by the image processing unit.

A data format of the interface information may be displayable in a web browser of the external device.

The memory may be capable of storing intermediate data during the development processing, and the image processing unit obtains the intermediate data from the non-transitory memory and performs the development processing.

The communication unit may transmit the intermediate data to the external device.

The development parameters may include a plurality of parameters, and when the communication unit receives a first portion of the plurality of parameters, the image processing unit uses the first portion of the plurality of parameters received by the communication unit and for a second portion of the plurality of parameters, reuses development parameters used previously in the development processing of the raw data.

The communication unit may receive the raw data from the external device, and based on the development parameters received by the communication unit, the image processing unit performs development processing of the raw data received by the communication unit.

The image processing unit may select a portion of the raw data specified by a user, and perform the development processing only on the selected portion of the raw data.

The apparatus may further include a display unit which displays the development data, wherein the display unit only displays development data on which development processing has been performed after being selected by the development unit.

The display unit may arrange and display on one screen, a plurality of development data items for which development processing has been performed by using different development parameters.

The apparatus may further include an external display control unit which controls an external display device to display the development data, wherein the external display control unit displays on the display device only the development data for which the development processing is performed after the development data is selected by the development unit.

The external display control unit may control a plurality of development data items for which development processing has been performed by using different development parameters, to be arranged and displayed on one screen of the display device.

According to various embodiments, a method for developing includes: generating raw data by photographing processing; transmitting interface information for displaying, on a display unit of an external device, a development interface which receives setting operations from a user that set development parameters used in development processing of the raw data; receiving the development parameters set on the external device from the external device; and based on the development parameters, performing the development processing of the raw data and generating development data for display.

BRIEF DESCRIPTION OF THE DRAWINGS

These and/or other embodiments will become apparent and more readily appreciated from the following description of various embodiments, taken in conjunction with the accompanying drawings in which.

DETAILED DESCRIPTION

Figure 1:
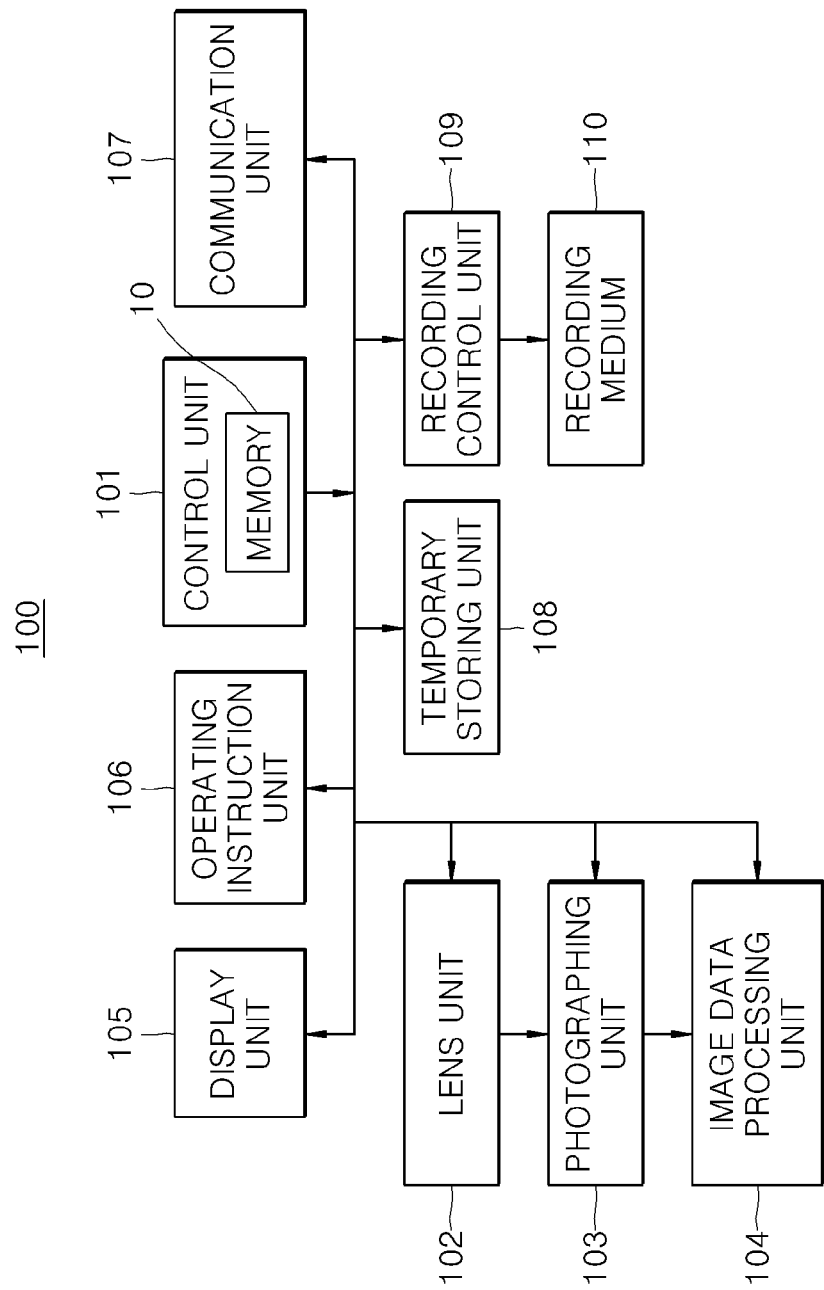
FIG. 1 is a block diagram of an electronic apparatus according to an embodiment.

As the invention allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the invention.

While such terms as "first," "second," etc., may be used to describe various components, such components must not be limited to the above terms. The above terms are used only to distinguish one component from another.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Various embodiments will be described below in more detail with reference to the accompanying drawings. Those components that are the same or are in correspondence are rendered the same reference numeral regardless of the figure number, and redundant explanations are omitted. As used herein, the term "and/or" includes any and all combinations of one or more of the associated listed items.

Expressions such as "at least one of," when preceding a list of elements, modify the entire list of elements and do not modify the individual elements of the list.

FIG. 1 is a block diagram of an electronic apparatus 100 (e.g., a photographing apparatus) according to an embodiment.

Referring to FIG. 1, the electronic apparatus 100 according to the embodiment may include a control unit 101, a lens unit 102, a photographing unit 103, an image processing unit 104, a display unit 105, an operating instruction unit 106, a communication unit 107, a temporary storing unit 108, a recording control unit 109 and a recording medium 110.

The components will now be explained.

The electronic apparatus 100 according to the present embodiment may capture still images and moving pictures by using the lens unit 102 to obtain an image and the photographing unit 103, which includes an image sensing device. Also, the electronic apparatus 100 may capture still images and moving pictures and may include various devices having image capturing capabilities and may further include the display unit 105. The display unit 105 may be, for example, a liquid crystal display or other monitor.

The control unit 101 according to the present embodiment may control one or more processes performed by the electronic apparatus 100 including photographing processing, development processing, and processing of a variety of image displays. For example, the control unit 101 according to the present embodiment may be formed as a semiconductor integrated circuit including a central processing unit (CPU) and a memory 10, such as a read-only memory (ROM) or random-access memory (RAM), storing a variety of programs. In this case, in the memory 10 (a first storing unit) of the control unit 101, interface information which will be explained later is stored. For example, the interface information will be explained in detail with reference to FIG. 2.

The lens unit 102 according to the present embodiment may guide light travelling from outside the electronic apparatus 100 to the photographing unit 103. For example, the lens unit 102 according to the present embodiment may include a group of lenses including a zoom lens or focus lens.

The photographing unit 103 according to the present embodiment may perform photographing processing and generate raw data according to operations of a user.

For example, the photographing unit 103 may include an image sensor such as a charge-coupled device (CCD) or a complementary metal-oxide semiconductor (CMOS) device.

For example, the raw data is the data generated by the image sensor, and may include data generated before image processing (such as development processing or correction processing) is performed.

Also, the raw data generated in the photographing unit 103 according to the present embodiment may be output to one or more of the image processing unit 104 or the temporary storing unit 108.

The image processing unit 104 (e.g., a development unit) according to the present embodiment may generate development data by performing development processing of the raw data based on various development parameters.

Also, the image processing unit 104 according to the present embodiment may perform image processing such as enlargement of an image, reduction of an image, or color correction.

For example, the development parameters may include parameters used in development processing such as de-mosaic processing, gamma correction processing, and white balance adjustment processing.

For example, the development data generated by the image processing unit 104 may include Joint Photographic Experts Group (JPEG) format data or Motion Picture Experts Group (MPEG) format data, and may be image data for display, displayable in the display unit 105 by decoding or decompressing processing.

Also, the development data generated in the image processing unit 104 may be output to the temporary storing unit 108.

Also, the development processing will be explained in detail with reference to FIG. 2.

The display unit 105 may display one or more of development data, a variety of menu screens for adjusting settings, or information on the main body of the electronic apparatus 100 according to instructions given by the control unit 101 of the present embodiment.

For example, the display unit 105 may include a liquid crystal display (LCD) or an organic electro-luminescence display (OLED).

The operating instruction unit 106 according to the present embodiment is an operation unit via which a user may input a variety of commands for operating the electronic apparatus 100. For example, the operating instruction unit 106 may include one or more of a button, a dial, or a touch panel.

Figure 3:
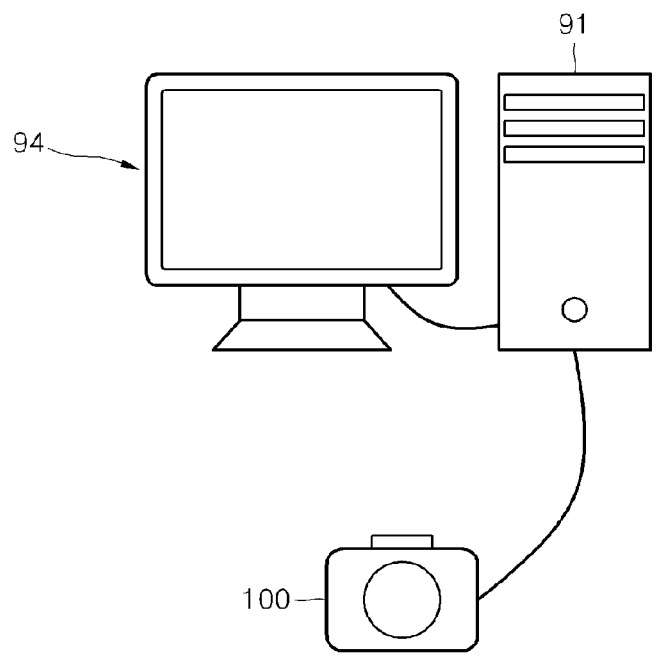
FIG. 3 is a schematic diagram of a system performing a method of developing an image in an electronic apparatus by using an external device according to an embodiment.

The communication unit 107 (e.g., an obtaining unit or a transmission unit) according to the present embodiment may communicate between the electronic apparatus 100 and an external device (e.g., personal computer 91 of FIG. 3).

For example, the communication unit 107 is connected to the external device by using wireless connections, such as Wi-Fi, or wired connections such as a universal serial bus (USB) cable. In this case, the communication unit 107 may communicate with an external device and thus transmit to and receive from the external device a variety of data items such as image data, interface information, or development parameters.

The temporary storing unit 108 (e.g., a second storing unit) according to the present embodiment is a memory for storing raw data or data in the middle of development processing.

Also, the temporary storing unit 108 may be used as a working area of the control unit 101. For example, the temporary storing unit 108 may include a dynamic random-access memory (DRAM).

The recording control unit 109 according to the present embodiment is a control unit for recording raw data or development data stored in the temporary storing unit 108 into a recording medium 110, and may control the writing and reading of data to and from the recording medium 110.

The recording medium 110 according to the present embodiment is a memory for recording raw data or development data. For example, the recording medium 110 may be an external memory such as a secure digital (SD) card, and may be provided to the electronic apparatus 100 in a detachable manner.

Operations of the external device of the electronic apparatus 100 will now be explained in detail.

Figure 2:
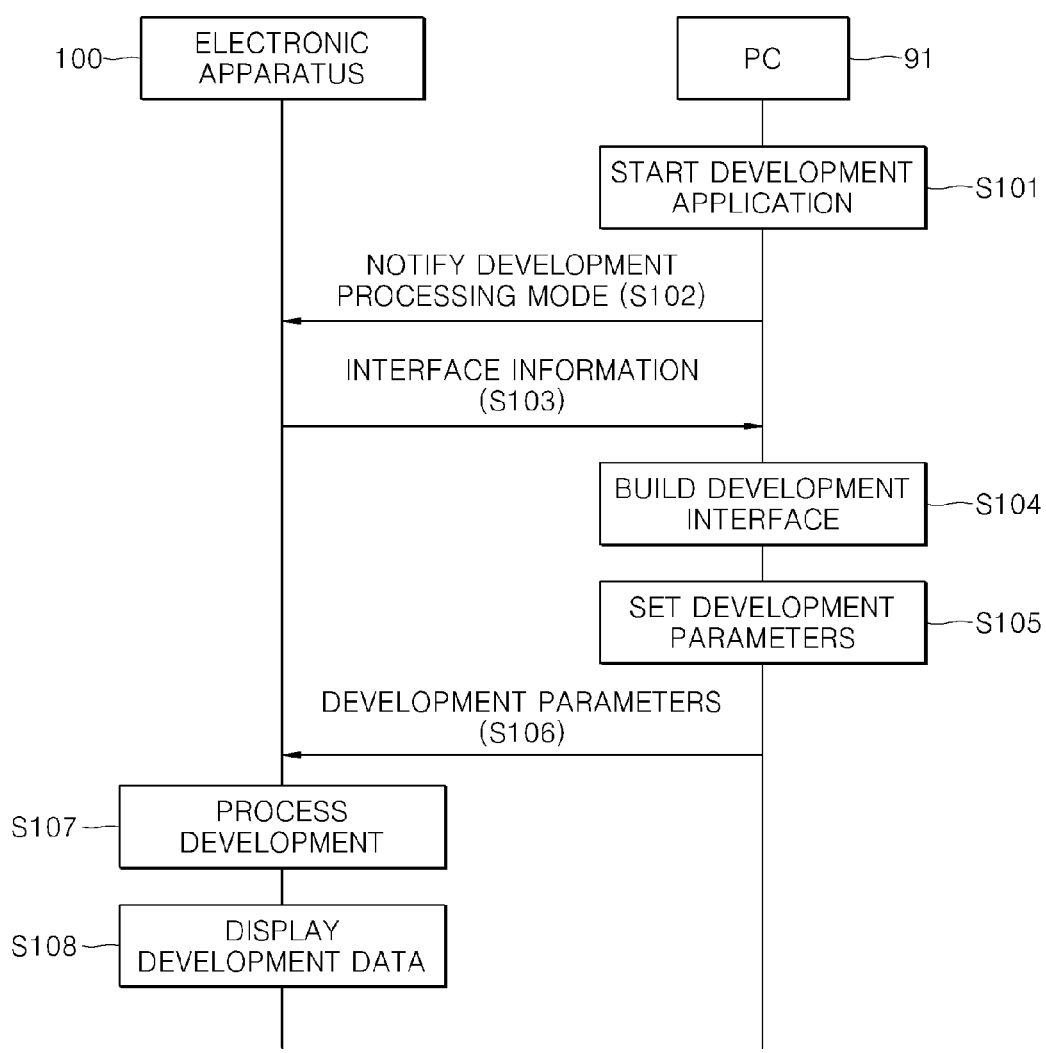
FIG. 2 is a flowchart of a method of developing raw data obtained from an electronic apparatus, by using an external device according to an embodiment.

FIG. 2 is a flowchart illustrating one example of a method of developing raw data according to an embodiment.

As shown in FIG. 2, the external device according to the present embodiment may include a personal computer (PC) 91. In this case, as shown in FIG. 3, the electronic apparatus 100 according to the present embodiment and the PC 91 may be connected through a USB cable. Also, the PC 91 according to the present embodiment may include or be connected to a display unit such as a monitor 92.

In operation S101, the PC 91 executes an application (e.g., software) for setting development parameters according to a user input. In this case, when the application starts, the PC 91 may determine that the electronic apparatus 100 is connected.

In operation S102, the PC 91 transmits to the electronic apparatus 100 a notification indicating that a development processing mode is to be executed.

For example, the application may be operated by the user, and thus a notification indicating that a development processing is to start may be transmitted to the electronic apparatus 100.

Also, the PC 91 may transmit a request for obtaining interface information to the electronic apparatus 100 together with the notification indicating that the development processing is to start.

The application according to the present embodiment may be stored in the PC 91 prior to execution.

For example, the application may be a general-purpose application which does not depend on the type of electronic apparatus, and a development interface (e.g., development interface 94, FIG. 3) dedicated to the electronic apparatus 100 may be constructed based on the interface information transmitted from the electronic apparatus 100. The development interface according to the present embodiment includes an interface for receiving an input for setting development parameters.

In operation S103, if the notification from the PC 91 indicating that the development processing mode is to be executed is received, the electronic apparatus 100 transmits to the PC 91 interface information stored in advance in the memory 10 of the control unit 101.

The interface information according to the present embodiment may include information for displaying a development interface on the monitor 92 of the PC 91.

For example, the interface information may include one or more of information on development parameters, contents of control instructions to which the electronic apparatus 100 responds, or image data used in displaying a development interface.

For example, information on the development parameters may include one or more of the type, the range (upper limit and lower limit), the initial values, the stride, the units and the data quantity of development parameters, or a list of options of development parameters.

In addition to the interface information, the electronic apparatus 100 may transmit to the PC 91 information on the main body of the electronic apparatus 100 or information on raw data which is to be processed via development processing.

The information on the main body of the electronic apparatus 100 according to the present embodiment may include information on the specifications of the electronic apparatus 100.

For example, the information on the main body of the electronic apparatus 100 may include one or more of the size (resolution) of a monitor of the display unit 105 of the electronic apparatus 100, the capacity of the temporary storing unit 108, the name of the type of the electronic apparatus 100, or the types of correction processing which the electronic apparatus 100 can perform.

Because the electronic apparatus 100 according to the present embodiment transmits these information items, when the PC 91 transmits a variety of data items to the electronic apparatus 100, the PC 91 may provide a variety of data items to satisfy various requirements of the electronic apparatus 100.

Also, the information on the development parameters and the information on the main body of the electronic apparatus 100 may include unique information which depends on the manufacturer or type of the electronic apparatus 100.

The information on the raw data according to the present embodiment may be information for specifying raw data which is an object of development processing. For example, information on the raw data may include one or more of the file name of the raw data, the size of raw data, or the date and time of photographing.

In operation S104, the PC 91 builds a development interface (e.g., development interface 94, FIG. 3) based on the interface information received from the electronic apparatus 100.

For example, the PC 91 may display on the monitor 92 of the PC 91 the development interface 94 including information indicating the types of development parameters available for the electronic apparatus 100. According to the present embodiment, the user may set (or adjust) development parameters by using the development interface 94 displayed on the monitor 92.

In operation S105, the PC 91 sets development parameters based on an input by the user via the development interface 94.

For example, the setting of the development parameters may include selecting the type of development parameters to be used, or selecting of a correction process to be executed from among a plurality of correction processes as well as inputting values of a variety of development parameters by using the development interface 94.

If the setting of the development parameters is completed in the PC 91 in operation S105, the PC 91 transmits the set development parameters to the electronic apparatus 100 in operation S106.

In operation S107, the electronic apparatus 100 performs development processing based on the development parameters received from the PC 91, by using the image processing unit 104. According to this, development data having a format displayable (for example, in a YCbCr format) on the display unit 105 may be generated.

In operation 108, the electronic apparatus 100 displays the development data generated in the image processing unit 104.

For example, the control unit 101 of the electronic apparatus 100 may control the display of the development data generated in the image processing unit 104 on the display unit 105.

Accordingly, the user may confirm whether or not the development data on which development processing is performed by using the set development parameters matches an intended image. Also, if the development data matches the intended image, the electronic apparatus 100 may store the development result in the recording medium 110 or may transmit the development result to the PC 91 and store the same in a recording medium in the PC 91 according to an operation by the user.

Also, by using other development parameters, the control unit 101 may control a plurality of development data items which are developed, so that the plurality of development data items are arranged and displayed on the display unit 105. Accordingly, the user may easily compare the development results of development data items which are developed according to the other development parameters.

FIG. 3 is a schematic diagram of a system performing a method of developing in an electronic apparatus 100 by using an external device according to an embodiment.

As shown in FIG. 3, the electronic apparatus 100 according to the present embodiment and the PC 91 may be connected through a USB cable.

Also, the PC 91 according to the present embodiment may include a monitor 92 as a display unit.

Figure 4:
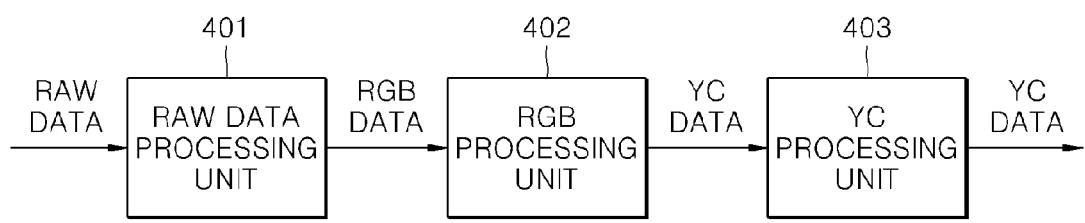
FIG. 4 is a block diagram of an image processing unit of an electronic apparatus according to an embodiment.

FIG. 4 is a block diagram illustrating an example of an image processing unit 104 of an electronic apparatus 100 according to an embodiment.

As shown in FIG. 4, the image processing unit 104 may include a raw data processing unit 401, an RGB processing unit 402 and a YC processing unit 403.

For example, image data (e.g., raw data) generated in the photographing unit 103 may be transformed from raw data to an RGB data format, and then to a YC data format (YCbCr data), through a variety of processes. In this case, generally, the raw data cannot be readily displayed for browsing, whereas the RGB data or YC data format can be more readily displayed for browsing.

The raw data processing unit 401 according to the present embodiment may perform, on each pixel of raw data being processed, an operation by using values of pixels surrounding the pixel, in addition to supplementary processing (e.g., de-mosaic processing). Accordingly, the data in a raw image format may be transformed to data in an RGB format. Also, the raw data processing unit 401 may output the generated RGB data to the RGB processing unit 402. For example, the RGB data may include data containing values of three colors, red, green and blue in each pixel.

The RGB processing unit 402 according to the present embodiment may perform image processing of the RGB data, and thus transform the RGB data into YC data (YCbCr data). For example, generating of YC data may be performed as preprocessing for JPEG or MPEG compression.

Also, the RGB processing unit 402 may output the generated YC data to the YC processing unit 403. For example, YC data may include data containing luminance and chrominance information of each pixel.

The YC processing unit 403 according to the present embodiment may perform a variety of correction processes, such as gamma correction, for YC data generated in the RGB processing unit 402. Also, the YC data corrected in the YC processing unit 403 may be compressed to form JPEG format data.

Also, during raw data development processing, for example, RGB data is input and RGB processing is performed. In this stage, though it is not processing of raw data, the processing or portions thereof will be referred to herein as "development processing" from now on in order to simplify explanation thereof. When a processing is required to be specified and emphasized particularly, individual expressions such as RGB processing or YC processing will be used. Since dedicated hardware (e.g., a processing circuit) for development processing is provided in the image processing unit 104 of the electronic apparatus 100, development processing can be completed in a relatively short amount of time.

Also, in each processing step, further subdivided processing steps are performed. For example, in the raw data processing unit, the main processing is de-mosaic processing for transforming raw data into RGB data, and as preprocessing, a variety of processing including adjusting the gain of each color or removing noise may be performed. For those processing, many development parameters may be used. A simple example of development parameters is 1 bit data for switching between ON/OFF of processing, and as another example, there may be a data item many kilobytes in size. Also, the development processing performed in the image processing unit 104 may use conventional methods, and further explanation thereof will be omitted.

According to the structure of the electronic apparatus 100 of the present embodiment as described above, the memory 10 of the control unit 101 of the present embodiment may store the types of development parameters as interface information.

Also, the communication unit 107 according to the present embodiment may transmit interface information to the PC 91. Also, the communication unit 107 according to the present embodiment may receive development parameters set in the PC 91 (e.g., set by the user via the development interface 94).

Also, the image processing unit 104 according to the present embodiment may perform development processing by using the development parameters received from the PC 91. Accordingly, setting (or adjusting) of development parameters may be performed in the PC 91, which may have a higher operational capability or visibility. As a result, the user can easily set development parameters.

Also, development processing according to the present embodiment is performed not in the PC 91, but in the image processing unit 104 of the electronic apparatus 100 having a development-dedicated hardware unit. Accordingly, high speed development processing can be provided.

Also, the electronic apparatus 100 according to the present embodiment may transmit to the PC 91 interface information including the type of development parameters. Accordingly, the PC 91 does not need to determine or store information about the type of development parameters that may be set (or adjusted) in the electronic apparatus 100 in advance (e.g., before connection of the electronic apparatus 100 to the PC 91).

That is, the PC 91 needs only to have a general-purpose application for setting development parameters and does not need to have an application dedicated to setting development parameters for the electronic apparatus 100 (e.g., for a specific electronic apparatus). Accordingly, a development interface 94 may be established in the PC 91 without depending on the type of an electronic apparatus.

In various embodiments, there may be a case where in development processing, development parameters are changed in increments and development processes are repeated until a development result intended by the user is obtained.

For example, in a case where optimal or preferred conditions for the parameters set in the raw data processing unit 401 shown in FIG. 4 are determined, the user may repeatedly change parameters for RGB processing (e.g., by the RGB processing unit 402) in order to find the preferred parameters for RGB processing. In this case, it is less efficient to repeatedly perform raw data processing for which development parameters have already been determined.

The electronic apparatus 100 in one example stores the result of the raw data processing in the middle of the development processing in a DRAM which is the temporary storing unit 108. In another example, the RGB data which is the result of the raw data processing, will hereinafter be referred to as intermediate data. Then, the image processing unit 104 obtains the intermediate data from the temporary storing unit 108 and continues development processing by using changed development parameters (in the present example, changed parameters for RGB processing). By doing so, only those processes after RGB processing needs to be repeated without repeating the raw data processing.

Accordingly, raw data processing does not have to be repeated with the same parameters, and efficiency and speed of the development processing are enhanced.

Also, the control unit 101 may transmit to the PC 91 the intermediate data stored in the temporary storing unit 108. For example, the intermediate data may be transmitted where an application for development in the PC 91 has a higher functionality or additional functionality compared to that of the image processing unit 104 of the electronic apparatus 100.

In this case, the electronic apparatus 100 transmits the intermediate data to the PC 91, and thus, only those processing steps that cannot be performed by the image processing unit 104 are performed in the PC 91 and the electronic apparatus 100 may perform the remaining processing steps.

In yet another embodiment, development parameters set in the PC 91 may be transmitted to the electronic apparatus 100 and then, only some of the development parameters are changed. In this case, development processing may be performed by using the changed development parameters, and the changed development parameters account for only some of the development parameters of the electronic apparatus 100. Accordingly, if all development parameters are transmitted whenever a development parameter is changed, transmission of unchanged development parameters is a less efficient use of transmission resources.

When only some of the development parameters are received from the PC 91, the electronic apparatus 100 in various embodiments does not obtain the remaining development parameters again. That is, the electronic apparatus 100 stores in the temporary storing unit 108 development parameters used in raw data processing, RGB processing and YC processing. Then, for the development parameters not obtained or received from the PC 91 again, the electronic apparatus 100 reuses development parameters used previously in the development processing by obtaining those previously used development parameters from the temporary storing unit 108. Thus, the PC 91 needs only to transmit to the electronic apparatus 100 the changed development parameters, and not all the development parameters, whenever a development parameter changes. As a result, efficiency of transmission and reception of development parameters is enhanced.

In some embodiments, during development processing, only a portion of an image is required or desired to be changed to an intended characteristic (e.g., brightness, color tone, sharpness, etc.). For example, a user may desire that the color of the sky is a blue color which the user prefers, or a case where the user desires that the face of a person has a higher image sharpness. In this case, it is a less efficient use of computing resources to perform development processing of the entire image whenever a development parameter is changed.

The electronic apparatus 100 in this case performs development processing after cutting or selecting only the portion of the image. In detail, the electronic apparatus 100 receives coordinates of an area (e.g., the portion of the image) which is to be development-processed in the image data (raw data), together with development parameters from the PC 91. Then, the image processing unit 104 cuts or selects the area corresponding to the received coordinates from the raw data, and performs development processing only for the cut raw data. Then, the control unit 101 displays on the display unit 105 of the electronic apparatus 100 the result of the development processing (development data).

The user changes the development parameters again if a development processed area resulting from the development processing is not as desired. On the other hand, if the development processed area is as desired, the user instructs the electronic apparatus 100 to develop the entire image by using the most recently used development parameters. Thus, by performing development processing on only a selected portion of an image, the amount of development processing which is performed until a desired development result is obtained can be reduced.

Also, the control unit 101 may display only a part of development data on the display unit 105. That is, the control unit 101 displays on the display unit 105 only the part of the development data which is cut and development-processed by the image processing unit 104. Thus, only the portion of the image specified by the user is displayed on the display unit 105. Accordingly, the user can easily confirm the development result without trying to find the cut part from the entire image.

In yet another embodiment, the electronic apparatus 100 may develop raw data stored in the PC 91 as well as raw data stored in the recording medium 110 which is provided to the main body of the electronic apparatus 100.

In detail, the electronic apparatus 100 receives, from the PC 91, development parameters which are set in the PC 91 by using the development interface 94, and raw data stored in advance in the PC 91. Then, the image processing unit 104 performs development processing of the received raw data by using the received development parameters. Thus, even in a case where the processing capability of the PC 91 is too low to perform development processing, the development processing can be performed in the electronic apparatus 100. That is, the electronic apparatus 100 connected to the PC 91 may be used as a device which performs the development processing. Thus, even if the PC 91 only has a processing capability for executing a development interface for setting development parameters, the raw data stored in the PC 91 can still be developed.

According to another embodiment, the electronic apparatus 100 stores in the memory 10 of the control unit 101 one or more HyperText Markup Language (HTML) files as interface information. As the interface information is an HTML file, the interface information can be accessed by using a web browser.

In detail, an HTML file which includes information on characters of a development interface to be displayed on a web browser of the PC 91 (for example, characters indicating the types or values of development parameters, etc.), layout positions of characters and images, and layout of the whole interface, is stored in advance in the memory 10 of the control unit 101. The memory 10 of the control unit 101 also stores image data such as icons used in the development interface. The electronic apparatus 100 transmits the HTML file and required image data to the PC 91.

By using a web browser, the PC 91 opens the received HTML file, and thus can display the development interface 94 on the monitor 92 of the PC 91. That is, in order to display the development interface 94, the PC 91 only needs to provide a web browser functionality and does not need any specific development application. Accordingly, the PC 91 does not need to have a pre-installed development application dedicated for a specific electronic apparatus 100. As a result, a development interface 94 may be provided by the PC 91 regardless of the type of electronic apparatus.

Also, by including in an HTML file help or text information, including sentences or descriptions for explaining processing steps performed in the electronic apparatus 100, development parameters, and manipulating methods of a development interface, the user may have a better understanding when setting development parameters. Also, a file which can be displayed by using a web browser is not limited to an HTML format, and an Extensible HyperText Markup Language (XHTML) format or an Extensible Markup Language (XML) format may also be used.

Figure 5:
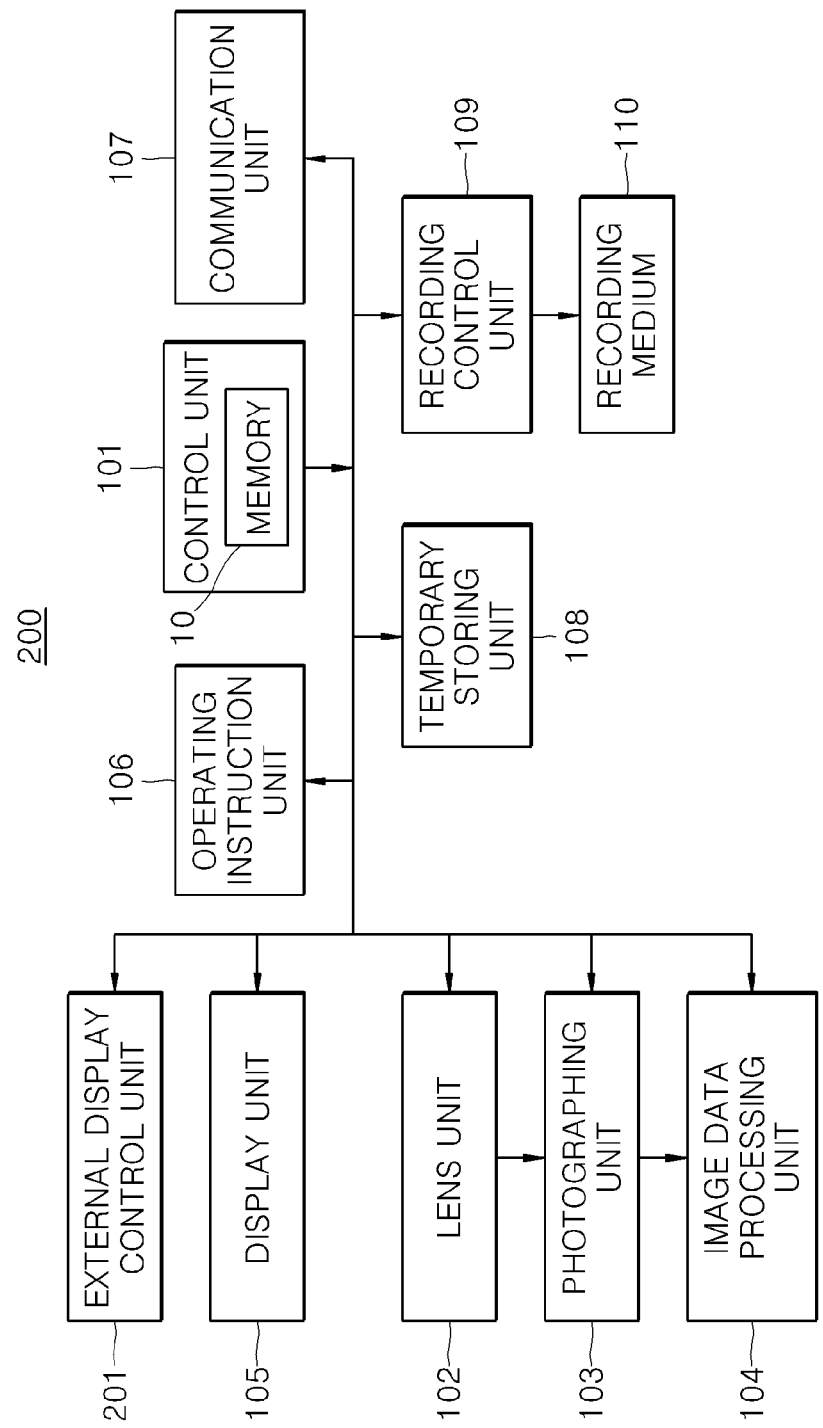
FIG. 5 is a block diagram of an electronic apparatus according to another embodiment.

FIG. 5 is a block diagram illustrating an electronic apparatus 200 according to another embodiment. Also, FIG. 6 is a schematic diagram of a system for performing a method of developing in an electronic apparatus by using an external device according to another embodiment.

As shown in FIG. 5, the electronic apparatus 200 may include an external display control unit 201. Other components of the electronic apparatus 200 are the same as those of the electronic apparatus 100, and explanations of those components will be omitted.

Figure 6:
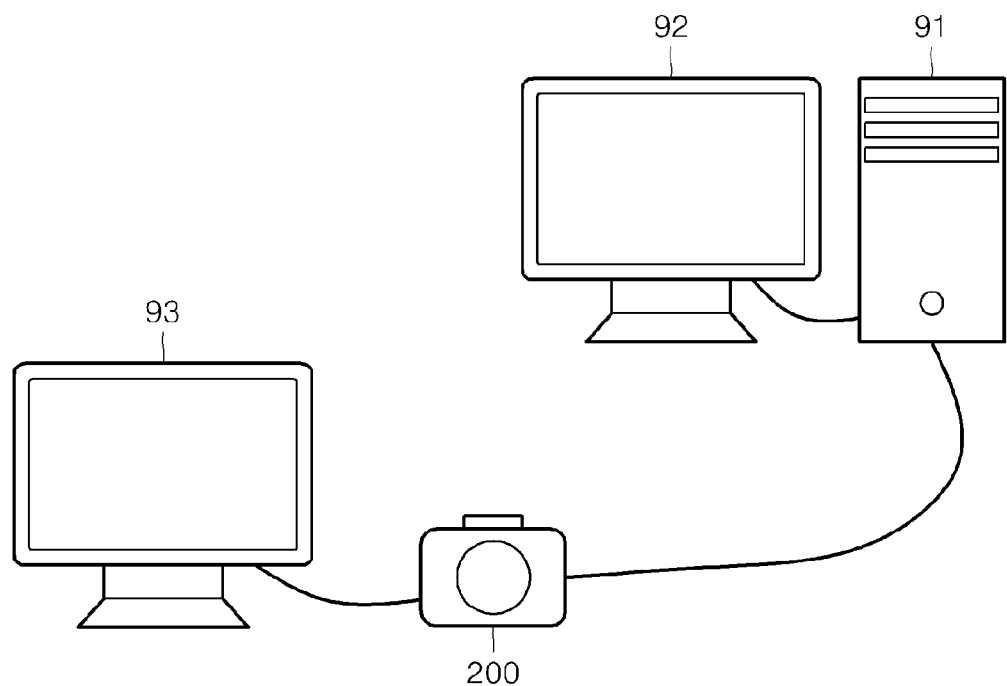
FIG. 6 is a schematic diagram of a system performing a method of developing in an electronic apparatus by using an external device according to another embodiment.

As shown in FIG. 6, the electronic apparatus 200 is connected to a display device 93, for example, through a high definition multimedia interface (HDMI) cable. For example, the display device 93 may be a television or a PC monitor, and may have a bigger screen than that of the display unit 105.

The external display control unit 201 according to the present embodiment may be connected to the display device 93 outside the electronic apparatus 200 and may control display of the display device 93.

The external display control unit 201 according to the present embodiment may transmit to the display device 93 development data which is developed by the image processing unit 104, and may display an image on the display device 93 corresponding to the development data transmitted to the display device 93. Also, adjustment of development parameters may be performed by using the PC 91 and the monitor 93 in the same manner as shown in FIG. 2, described above.

The external display control unit 201 of the electronic apparatus 200 according to the present embodiment may display an image for which development processing has been completed, on the external display device 93, which is different from (i.e., bigger than) the display unit 105 provided in the electronic apparatus 200. Thus, the user may confirm the result of the development processing on a bigger screen than that of the display unit 105. Accordingly, visibility is enhanced.

Also, the external display control unit 201 may display on the display device 93 an image based on intermediate data in the middle of development processing. For example, by displaying an image of RGB data after raw data is processed, as an image in the middle of development processing, the user may confirm on the bigger screen whether or not the raw data processing result is as desired.

Also, the external display control unit 201 may display only a portion of a developed image on the screen of the display device 93. Thus, the user may confirm on the bigger screen whether or not the result of the development processing of the portion of the image is as desired.

Also, the external display control unit 201 may arrange and display on the screen of the display device 93 a plurality of development data items for which development processing is performed by using other development parameters.

Thus, the user may compare, on the bigger screen, the development data which are developed by using a plurality of different development parameters.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An electronic apparatus comprising:
    a photographing unit which generates raw data by using an image sensor;
    a non-transitory memory which stores interface information for displaying, on a display unit of an external device, a development interface which receives setting input signals that set development parameters used in development processing of the raw data;
    a communication unit which transmits the interface information to the external device and receives from the external device the development parameters set on the external device via the development interface; and
    an image processing unit which, based on the development parameters received from the communication unit, performs the development processing of the raw data and generates development data for display.

2. The apparatus of claim 1, wherein the interface information comprises information indicating a type of development parameters which are configurable in the development processing performed by the image processing unit.

3. The apparatus of claim 1, wherein a data format of the interface information is display able in a web browser of the external device.

4. The apparatus of claim 1, wherein the non-transitory memory stores intermediate data during the development processing, and the image processing unit obtains the intermediate data from the non-transitory memory and performs the development processing.

5. The apparatus of claim 4, wherein the communication unit transmits the intermediate data to the external device.

6. The apparatus of claim 1, wherein the development parameters comprise a plurality of parameters, and
when the communication unit receives a first portion of the plurality of parameters, the image processing unit uses the first portion of the plurality of parameters received by the communication unit and for a second portion of the plurality of parameters, reuses development parameters used previously in the development processing of the raw data.

7. The apparatus of claim 1, wherein the communication unit receives raw data from the external device, and
based on the development parameters received by the communication unit, the image processing unit performs development processing of the raw data received by the communication unit.

8. The apparatus of claim 1, wherein the image processing unit selects a portion of the raw data specified by a user, and performs the development processing only on the selected portion of the raw data.

9. The apparatus of claim 8, further comprising a display unit which displays the development data,
wherein the display unit only displays development data on which development processing has been performed after being selected by the image processing unit.

10. The apparatus of claim 9, wherein the display unit arranges and displays on one screen, a plurality of development data items for which development processing has been performed by using different development parameters.

11. The apparatus of claim 8, further comprising an external display control unit which controls an external display device to display the development data,
wherein the external display control unit displays on the display device only the development data for which the development processing is performed after the development data is selected by the image processing unit.

12. The apparatus of claim 11, wherein the external display control unit controls a plurality of development data items for which development processing has been performed by using different development parameters, to be arranged and displayed on one screen of the display device.

13. A development method comprising:
generating raw data by using an image sensor;
transmitting interface information for displaying, on a display unit of an external device, a development interface which receives setting input signals from a user that set development parameters used in development processing of the raw data;
receiving the development parameters set on the external device from the external device via the development interface; and
based on the development parameters, performing the development processing of the raw data and generating development data for display.

* * * * *